United States Patent [19]

Engman et al.

[11] Patent Number: 5,927,481
[45] Date of Patent: Jul. 27, 1999

[54] ARRANGEMENT FOR TRANSPORTING WIRE COILS

[75] Inventors: Bertel Engman, Sundsbruk; Bruno Wiklund, Bergeforsen, both of Sweden

[73] Assignee: Sunds Birsta AB, Sundsvall, Sweden

[21] Appl. No.: 08/791,734

[22] Filed: Jan. 31, 1997

[51] Int. Cl.⁶ .................................................. B65G 17/32
[52] U.S. Cl. ...................... 198/867.13; 198/465.4; 198/687.1; 198/803.2; 198/681; 198/790
[58] Field of Search ............................. 198/465.4, 687.1, 198/867.13, 803.2, 681, 780, 789, 790; 104/168

[56] References Cited

U.S. PATENT DOCUMENTS

| | | | |
|---|---|---|---|
| 939,334 | 11/1909 | Schmidt | 104/168 X |
| 1,550,248 | 8/1925 | Gehnrich | 198/681 X |
| 3,735,710 | 5/1973 | Hickman | 104/168 |
| 3,910,197 | 10/1975 | Charpentier | 198/803.2 X |
| 3,926,303 | 12/1975 | McCall | 198/687.1 |
| 4,062,444 | 12/1977 | Nakov et al. | 198/803.2 |
| 4,557,373 | 12/1985 | Paurat et al. | 198/687.1 X |
| 5,159,880 | 11/1992 | Mugnier | 104/168 X |

FOREIGN PATENT DOCUMENTS 1573302  8/1980  United Kingdom ................ 198/465.4

Primary Examiner—Johnny D. Cherry
Assistant Examiner—Steven B. McAllister
Attorney, Agent, or Firm—Pillsbury Madison & Sutro

[57] ABSTRACT

An arrangement for transporting wire coils and similar products in a rolling mill or the like, including conveyor system, along which a load carrier, carrying the wire coil, is intended to be conveyed, and the conveyor system having a large number of modules, placed in series, and each one having a driving unit and a plurality of the wheel pairs, which are driven by the driving unit, and which are intended to bring the load carrier forwards or backwards. Each module has such a design that it can be used when transporting horizontally and vertically arranged wire coils. The driving unit includes a motor which is intended to drive one of the wheel pairs, the driving force from his wheel pair being intended to be transmitted to an adjacent wheel pair by means of a transmission belt. The load carrier, carrying the wire coil, is intended to be controlled by a male element positioned in the mentioned carrier, which is intended to cooperate with a female element in the form of a groove-like device, which is fastened in each module and extends essentially along the longitudinal center line of each module.

7 Claims, 3 Drawing Sheets

ARRANGEMENT FOR TRANSPORTING WIRE COILS

BACKGROUND OF THE INVENTION

This invention relates to an arrangement for transporting wire coils or similar products in a rolling mill or the like, the arrangement comprising a conveyor system, along which a load carrier, carrying the wire coil, is intended to be conveyed, and the conveyor system having a large number of modules, placed in series and each one comprising a driving unit and a plurality of wheel pairs, which are driven by the driving unit, and which are intended to bring the load carrier forwards or backwards.

Such an arrangement is previously known in the market.

For controlling the load carrier, carrying the wire coil, are utilized according to the known arrangement, the driving wheels, which cooperate with a rail section on each side of the module, the rail section carrying the mentioned load carrier, and which for the mentioned reason are provided with a flange.

However, it has appeared that the wear of the rail sections and of the wheels provided with flanges has become great, and for this reason among others a further development of the arrangement has been made, which is apparent from this invention.

BRIEF SUMMARY OF THE INVENTION

It is an object of the invention to reduce the wear of the rail sections of such arrangement.

DETAILED DESCRIPTION OF THE INVENTION

Figure 1:
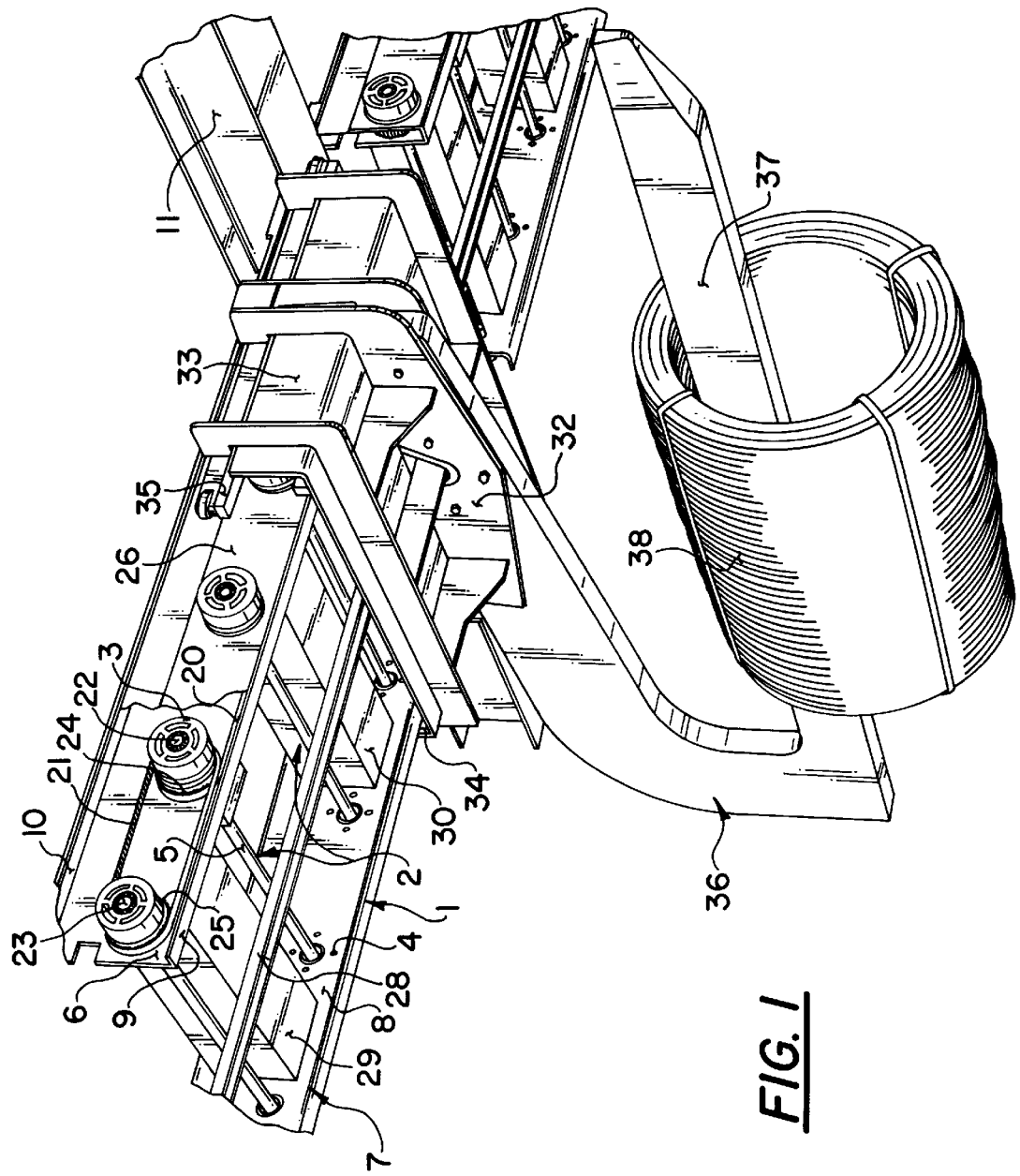
FIGS. 1 and 2 are perspective views of an embodiment of the invention.
Figure 2:
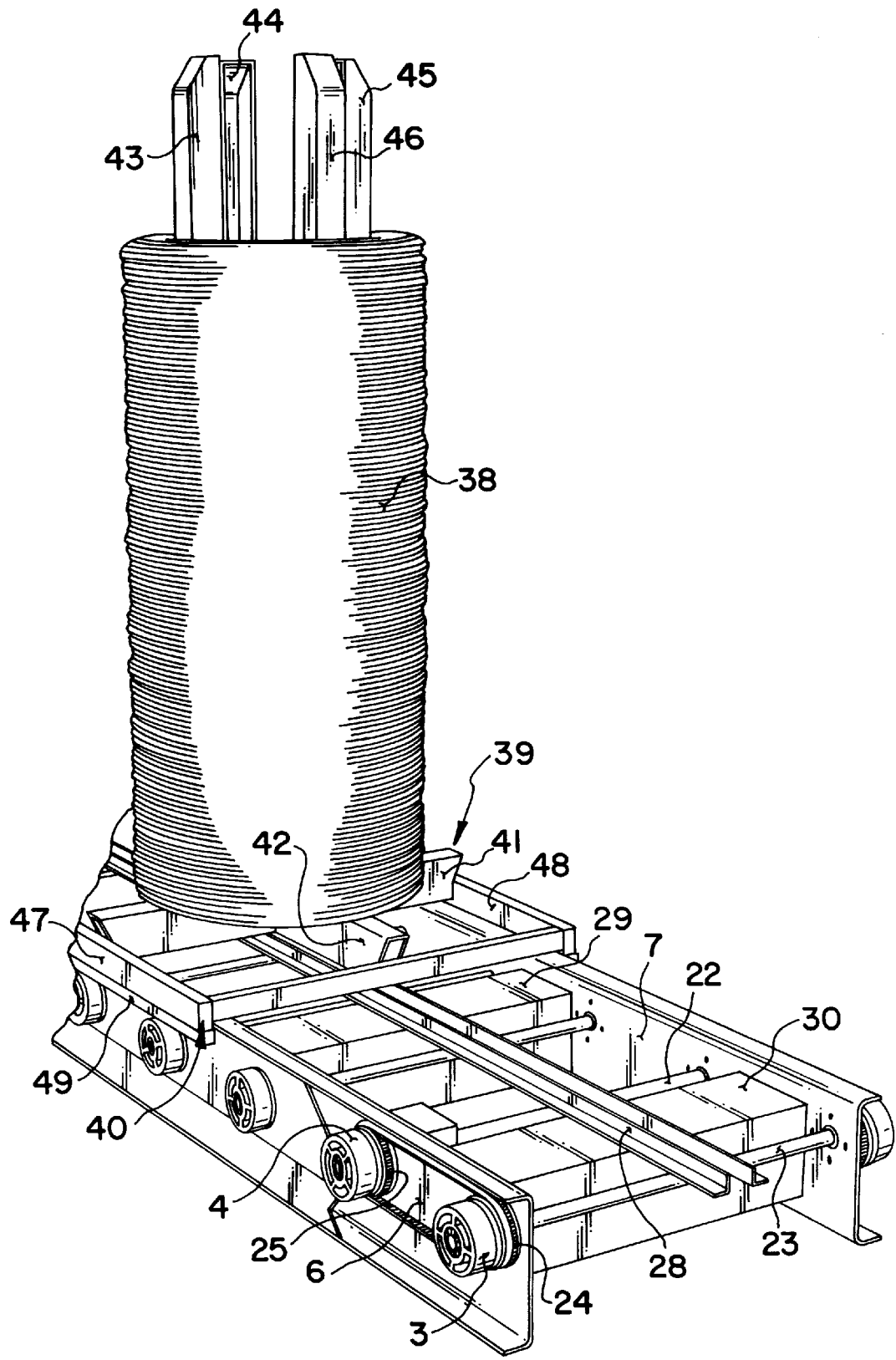
Figure 3:
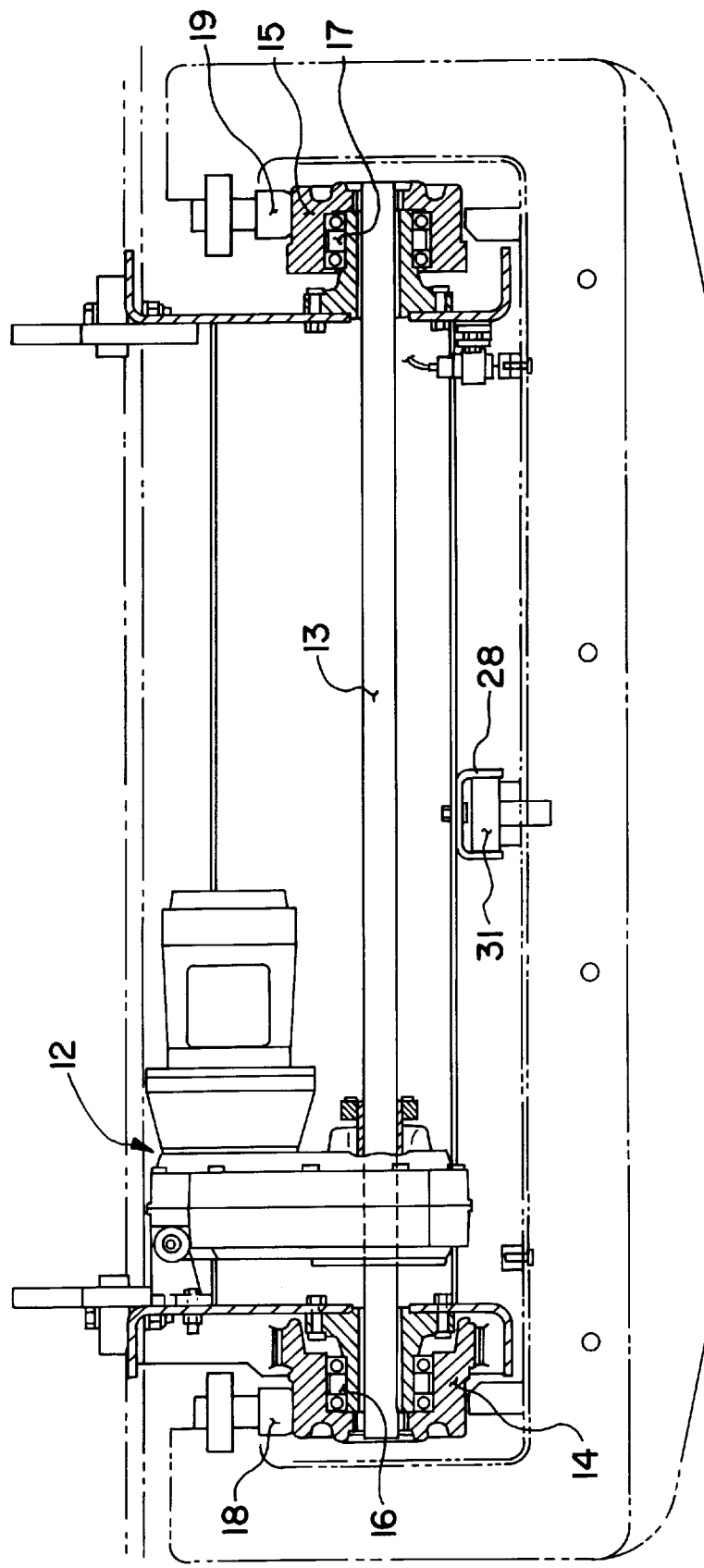
FIG. 3 is a longitudinal cross-sectional view of the embodiment of FIGS. 1 and 2.

Two preferred embodiments of the new invention shall be described more closely below with reference to the accompanying drawings, in which FIG. 1 shows a first embodiment, where the wire coil is intended to be transported in a horizontal position, FIG. 2 shows a second embodiment of the invention, where the wire coil is intended to be transported in a vertical position, and FIG. 3 shows a longitudinal cross section through a wheel pair which is provided with an integrated driving unit.

The conveyor system itself, which is common for the two embodiments, comprises a large number of modules 1, positioned in series, which modules can be of different sizes, but all of which have at least three wheel pairs 2, each wheel pair comprising two wheels 3, 4 and a shaft 5 connecting these two wheels. Each module comprises two parallel, at a distance from each other arranged U-shaped girders 6, 7, which are penetrated by the shaft 5. Each girder has such a position, that the bottom portion 8 of one U-designed girder is directed towards the bottom portion of the other U-designed girder, which means that the two legs 9, 10 of the "U" are directed outwards. This means also that the upper leg 9 and the vertical portion of the girder can be utilized for suspension of the module in a high, structural steel 11 in the mill, which is shown in FIG. 1, and which means that the area of the floor of the mill hall is made free.

Each module has a driving unit 12, comprising a gear motor, which is positioned directly on one 13 of the shafts of the module, which connects the two wheels 14, 15 of a wheel pair (see FIG. 3). Due to the mentioned position of the gear motor, the power transmission becomes very effective, since the shaft directly transmits the driving moment to respective wheel, at the same time as the driving system becomes very compact.

As is apparent from FIG. 3, each wheel 14, 15 has a bearing unit 16, 17, which is positioned inside of respective wheel, and which is fastened to respective U-shaped girder with its bearing pivot. This means that the load in the form of the heavy wire coil, which is transferred to the wheels via a rail section 18, 19, which shall be described more closely below, will be taken up by respective bearing and be transferred to respective U-shaped girder without any bending moments arising on the shaft.

As has been mentioned previously only one shaft is driven, but in order that the invention shall function suitably, all wheels of every module are driving, which means that the power from the driven wheel shaft must be transmitted to the remaining wheel shafts of the module. This is made by means of synchronous transmission belts 20, 21, one transmission belt transmitting power from one shaft 22 to an adjacent shaft 23, and which are intended to cooperate with pulleys 24, 25, the pulleys being arranged at the inner side of each wheel 3, 4; 14, 15 of the transmission side and being in fixed connection with this one. By having this synchronous transmission belt operation, an operation system is created which requires no maintenance. Previously when a chain transmission was utilized, it was necessary to lubricate with even intervals, which in first hand contaminated the wire coil but also the mill floor, and to retension the chains regularly. Moreover, the transmission belt operation is essentially soundless, which gives a very good working environment from an acoustical point of view.

As is apparent from FIGS. 1, 2 the gear belt transmission is entirely encased, which has been made possible by the fact that a longitudinal cover plate 26, 27 has been arranged on the transmission side of each module, the cover plate having a position between the regular wheel and the gear wheel-like means. Due to that fact the risk of contamination of the gear belt transmission is minimized at the same time as the risk of person injuries by squeezing is minimized. The regular wheel and the gear wheel-like means preferably constitute an integrated unit.

The driving unit 12 according to the invention also comprises a frequency converter, which controls the acceleration and the retardation in an optimal way, whereby no uncontrolled stresses arise on the conveyor system. The frequency converter also ensure that the load carrier stops in a predetermined position.

Another important part of the arrangement according to the invention, which is common to the two embodiments, is that means that controls the load carrier carrying the wire coil. This control means comprises a female control means in the form of a groove-like means 28, which extend parallel with the U-shaped girders of each module and essentially half way between these ones. The groove-like means is fastened to platebox-like means 29, 30, which are arranged between the U-shaped girders. For cooperation with the female means 28 the load carrier has a male control means 31, projecting into the female means and being controlled by this one.

This central control eliminates the negative squeezing-effect known from drawers, which has been able to arise in conveyor systems according to previous technique, and reduces the costs of maintenance to a minimum.

As has been mentioned previously, FIG. 1 shows an arrangement which is intended to be used when transporting wire coil-like products, which are horizontally arranged.

The load carrier, carrying the wire coil, has in this case a U-formed frame 32, which is arranged on the underside of the girders 6, 7, which connect the wheel pairs, the two legs 33, 34 of the U projecting up on the outside of respective girder 6, 7 and accordingly also of the wheel means 3, 4. At the upper portion of each leg 33, 34 is an essentially horizontal rail section 35 arranged, which is intended to be in contact with the top surface of the wheel means and has such a length, that it is larger than the pitch distance of three shafts.

On the underside of the frame is a hook-like means 36 fastened. This means has an essentially horizontal, speer-like means 37, on which the wire coil 38 is intended to be threaded. This means that the wire coil in this case gets such a position that an imaginary, longitudinal centre line through the same becomes essentially horizontal.

The frame 32 of the load carrier for its control has a male means 31 (see FIG. 3) which is intended to cooperate with the groove-like means 28, which in this case extends on the underside of the modules.

In FIG. 2 is shown the second embodiment, which relates to a transport of vertically arranged wire coils, i.e. wire coils the imaginary, longitudinal centre axis of which extends essentially vertically. The wire coil 38 is carried by a load carrier 39, comprising a square or a rectangular, frame-like bottom portion 40, the opposite sides of which are connected by two cross-laid, horizontal supporting rods 41, 42 for the wire coil. From these supporting rods 41, 42 extend four vertical supporting rods 43–46 with a radially movable outer part, on which rods the wire coil is intended to be threaded. Two 47, 48 of the opposite sides of the bottom portion 40 are on their underside provided with a rail section 49, which is intended to be in contact with the top surface of the wheel means, and which is like the rail section 35 of the embodiment according to FIG. 1.

An essential difference in relation to previously known techniques is the fact that the same modules of the conveyor system can be used for transporting vertical wire coils as for transporting horizontal wire coils. The only thing that needs to be done is to turn the modules upside down, which means that the groove-shaped control means of the load carrier is positioned on the top side of the modules. In the vertical case the modules as a rule are carried by structural steelworks, which are arranged on the floor of the mill hall.

The invention is of course not limited to what has been shown and described but can be modified within the scope of the following claims.

We claim:

1. An arrangement for transporting wire coils and similar products, said arrangement comprising:
   a load carrier for carrying one of the wire coils and a conveyor system for conveying said load carrier, said conveyor system having a plurality of modules placed in series along said conveyor system, wherein:
   each of said modules has a longitudinal center line and comprises:
   a plurality of wheel pairs for moving said load carrier in a selected forward or backward direction parallel to the center line;
   a driving unit for driving said plurality of wheel pairs;
   two girders extending parallel to, and spaced from, one another;
   a plurality of pivot bearings each supporting a respective wheel of said wheel pairs; and
   a plurality of shafts each penetrating said girders and connecting the wheels of a respective wheel pair;
   each of said modules selectively transporting horizontally and vertically arranged wire coils;
   said driving unit of each of said modules comprises a motor for driving one of said wheel pairs of said driving unit and a transmission belt mounted for transmitting a driving force from said one of said wheel pairs to an adjacent wheel pair;
   said load carrier comprises male control means; and
   each of said modules carries female control means in the form of groove-like means which extends along the center line of said module for cooperating with said male control means.

2. An arrangement according to claim 1 wherein said driving unit of at least one of said modules comprises a frequency converter for controlling acceleration and retardation of said conveyor system to prevent uncontrolled stresses from being built up in said conveyor system.

3. An arrangement according to claim 1 for transporting horizontally arranged wire coils, wherein
   each of said modules has an underside, said load carrier has a U-shaped frame arranged at the underside of said modules and said U-shaped frame has two legs that project outside of at least one of said wheels;
   each of said legs of said U-shaped frame of said load carrier has an essentially horizontal rail section at an upper portion of the respective leg and each of said wheels has a top surface located to contact a respective rail section;
   said shafts of each of said modules are spaced apart by respective pitch distances and each said rail section has a length greater than twice the pitch;
   said U-shaped frame includes a hook means for carrying a wire coil;
   said female control means of each of said modules is located at the underside of said module; and
   said male control means is disposed in said U-shaped frame.

4. An arrangement according to claim 1, characterized in that the driving unit comprises a gear motor, which is arranged directly on one of the shafts connecting the wheel pairs.

5. An arrangement according to claim 1, characterized in that each wheel has a bearing unit, positioned inside of the wheel, which is fastened with its bearing pivot in the girder which is positioned close to said wheel.

6. An arrangement according to claim 1 further comprising a plurality of pulleys each associated with, and constituting an integrated unit with, a respective one of said wheels, and wherein said transmission belt of each said module cooperates with at least one of said pulleys.

7. An arrangement according to claim 6 wherein each of said modules has a transmission side and includes a longitudinal cover plate at said transmission side, said cover plate being positioned between one of said wheels and said pulleys associated with said one of each wheels.

\* \* \* \* \*